United States Patent [19]

Soula et al.

[11] 4,199,462
[45] Apr. 22, 1980

[54] COMPOSITIONS BASED ON ALKENYL SUCCINIMIDES, A METHOD OF PREPARING THEM, AND LUBRICANT COMPOSITIONS CONTAINING THEM

[75] Inventors: Gerard Soula, Meyzieu; Jean-Paul Lefévre, Le Havre, both of France

[73] Assignee: Orogil, Courbevoie, France

[21] Appl. No.: 958,960

[22] Filed: Nov. 9, 1978

[30] Foreign Application Priority Data

Nov. 21, 1977 [FR] France .................. 77 34847

[51] Int. Cl.² .............. C10M 1/20; C10 1/32; C07D 207/12
[52] U.S. Cl. .............. 252/51.5 A; 260/326.26; 260/326.5 FM
[58] Field of Search .............. 252/51.5 A; 260/326.26, 260/326.5 FM

[56] References Cited

U.S. PATENT DOCUMENTS

| | | | |
|---|---|---|---|
| 3,306,907 | 2/1967 | McNinch et al. | 260/326.3 |
| 3,438,899 | 4/1969 | Benoit | 252/51.5 A |
| 3,471,458 | 10/1969 | Mehmedbasich | 252/51.5 A |
| 3,806,456 | 4/1974 | Vogel | 252/51.5 A |
| 4,081,388 | 3/1978 | Soula et al. | 252/51.5 A |
| 4,094,802 | 6/1978 | Soula et al. | 252/51.5 A |

Primary Examiner—W. J. Shine

[57] ABSTRACT

New lubricant additive compositions containing at least one alkenyl succinimide of the formula:

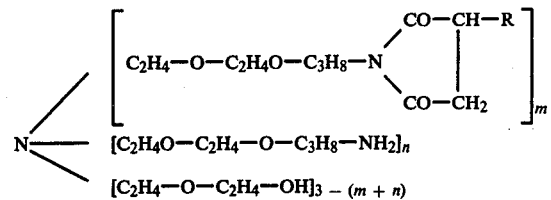

in which
  R is an alkenyl group of $C_{20}$–$C_{200}$,
  m is a whole number from 1 to 3,
  n is a whole number from 0 to 2, with
  m+n being from 1 to 3.

They are produced from the reaction of an alkenyl succinic anhydride comprising a $C_{20}$–$C_{200}$ alkenyl group and at least one amine of the formula:

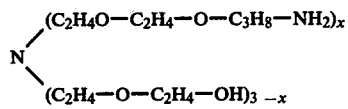

in which x is a whole number from 1 to 3.

The additive compositions are useful in lubricating oils.

9 Claims, No Drawings

COMPOSITIONS BASED ON ALKENYL SUCCINIMIDES, A METHOD OF PREPARING THEM, AND LUBRICANT COMPOSITIONS CONTAINING THEM

BACKGROUND OF THE INVENTION

The present invention comprises novel additive compositions of new alkenyl succinimides derived from aminoalkoxyamines, the method of preparing them, and lubricant compositions containing them.

Alkenyl succinimides derived from aminoalkoxyamines which can be used as lubricant additives have already been described in U.S. Pat No. 4,081,388 of Gerard Soula et al. These alkenyl succinimides are prepared from aminoalkoxyamines obtained by the cyanoethylation of triethanolamine with, for instance, acrylonitrile, followed by a hydrogenation. The products obtained had very good characteristics as additives for lubricating oils.

By virtue of the present invention, applicants have found new lubricant additive compositions based on alkenyl succinimides which impart to the lubricating oils performances as good as those imparted by the aforementioned prior additives, but at lower concentration.

It is, accordingly, an object of the present invention to provide novel lubricant additive compositions based on alkenyl succinimides derived from aminoalkoxyamines which impart to lubricating oils excellent performance characteristics at reduced concentrations in the lubricant.

It is a further object of the present invention to provide novel methods for producing the new lubricant additive compositions.

It is also an object of the present invention to provide novel lubricants containing the novel lubricant additive compositions of the present invention.

Further objects of the present invention will be apparent to those skilled in the art from the present disclosure.

GENERAL DESCRIPTION OF THE INVENTION

The new lubricant additive compositions are based on alkenyl succinimides and comprise at least one alkenyl succinimide of the formula:

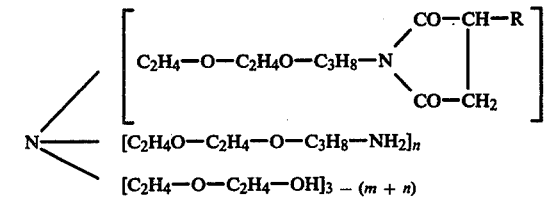

in which R represents an alkenyl group containing from about 20 to 200 carbon atoms; m is a whole number of 1 to 3; n is a whole number of 0 to 2; with m+n being from 1 to 3.

The new lubricant compositions of the invention can be prepared by the novel process of the invention by the action of an alkenyl succinic anhydride, in which the alkenyl group contains from 20 to 200 carbon atoms, on at least one aminoalkoxyamine of the formula:

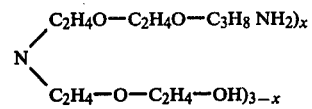

in which x is a whole number from 1 to 3. The condensation reaction of the alkenyl succinic anhydride and aminoalkoxyamine takes place at a temperature between about 120° and 230° C., and preferably between about 140° and 180° C., in a ratio of the number of equivalents of amines to the number of equivalents of acid anhydride of between about 0.4 and 0.6. By number of equivalents of amine, it is to be understood to refer to the number of —NH$_2$ units in the aminoalkoxyamines employed; by number of equivalents of acid anhydride, it is to be understood to refer to the number of

units in the alkenyl succinic acid anhydride employed. Theoretically, one equivalent of amine is required for two equivalents of acid anhydride in order to form a succinimide ring.

The reaction may be carried out in the presence of a diluent in order to decrease the viscosity of the reaction medium. Said diluent will preferably be selected from among the lubricating oils, examples of base oils of which will be given below.

The alkenyl succinic anhydrides used are prepared in known manner, for instance, by condensation by heat (see U.S. Pat. No. 3,306,907) of maleic anhydride on a polyolefin of average molecular weight of between 400 and 4000. Said polyolefin is selected from among the oligomers or polymers of C$_2$-C$_{30}$ olefins, optionally branched, or the copolymers of said olefins with each other or with diene or vinyl aromatic comonomers. Among such polyolefins, mention may be made by way of preference of the oligomers of C$_2$-C$_{20}$ α-mono-olefins, such as the oligomers of ethylene, propylene, butene-1, isobutene, 3-cyclohexyl-butene-1, 2-methyl-5-propyl-hexene-1, the copolymers of these α-olefins with each other or with internal olefins, as well as the copolymers of isobutene with a comonomer selected from among butadiene, styrene, hexadiene-1,3, or the conjugated or unconjugated dienes and trienes.

The condensation reaction can also be carried out in the presence of chlorine (see U.S. Pat. No. 3,231,587 and Belgian Pat. No. 805,486), iodine (British Pat. No. 1,356,802), or bromine (French patent application No. 74.18915, filed May 31, 1974, in the name of the French company, Rhone-Progil). This condensation reaction can also be carried out starting from monochlorinated or monobrominated polyolefins, as indicated in the French patent published under No. 2,042,558.

The aminoalkoxyamines employed to prepare the new lubricant additive compositions of the invention can be obtained by cyanoethylation of tris(5-hydroxy-3-oxapentyl)amine by acrylonitrile in a molar ratio of acrylonitrile to amine of between 1 and 4.5, followed by hydrogenation of the nitriles obtained. These aminoalkoxyamines and their preparation are the subject matter of a copending application of Gerard Soula and Joel Leludec, assigned to Rhone-Poulenc Industries, Ser. No. 957,925, filed Nov. 6, 1978.

A molar ratio of acrylonitrile to amine which is greater than or equal to 3.5 makes it possible to obtain tris(9-amino-3,6-dioxa-nonyl)amine, selectively.

A molar ratio of acrylonitrile to amine which is less than 3.5 makes it possible to obtain a mixture of amines which may contain N,N,N-tris(9-amino-3,6-dioxa-nonyl) amine, N-(5-hydroxy-3-oxa-pentyl)-N,N-bis(9-amino-3,6-dioxa-nonyl)amine, and N,N-bis(5-hydroxy-3-oxa-pentyl)-N-(9-amino-3,6-dioxa-nonyl)amine.

The cyanoethylation of the tris(5-hydroxy-3-oxapentyl)amine can be carried out by the general methods described in the literature ["The Chemistry of Acrylonitrile," 2nd edition, American Cyanamid Corp., New York, p. 24 (1958); or H. A. Bruson, "Organic Reactions," 5, p. 79 (1949); or U.S. Pat. No. 2,326,721.] It is customarily carried out in the presence of a basic catalist such as sodium, potassium, the oxides, hydroxides, alcoholates or amides of alkaline metals, or the quaternary ammonium bases, such as trimethyl benzylammonium hydroxide. The amount of alkaline agent to be used varies from 0.1 to 5 percent, referred to the weight of alkanolamine employed. In general, an amount of less than 1 percent is sufficient to produce the effect desired.

The cyanoethylation is carried out at a temperature of between about 0° and 100° C., and preferably between about 30° and 50° C.

The reaction can be carried out in the presence or absence of an organic solvent. As solvent, benzene, dioxane, pyridine or acetonitrile can, for instance, be used. The reaction may also be carried out in the presence of water.

Upon the introduction of the reagents, it is preferable to dissolve or disperse the catalyst in the alkanolamine, possibly diluted by the solvent, and to add the nitrile to the medium with agitation.

The cyanoethylation product which has been obtained above can be hydrogenated, directly or possibly after isolation, by any suitable means. Its reduction can be effected by the customary methods for the reduction of nitriles. See Houben-Weyl, "Methoden der Organischen Chemie," 4th edition, Vol. XI/559 (1957). The method most commonly used is hydrogenation in the presence of nickel or cobalt catalysts, whether or not deposited on a support. However, more particularly, Raney nickel or Raney cobalt is employed in a proportion of 5 to 30 percent referred to the weight of the nitrile treated.

It is advantageous to effect the hydrogenation with such catalysts in liquid ammonia or preferably in the presence of a base in aqueous or organic medium. As the base, barium, sodium, potassium, or lithium hydroxide or quaternary ammonium hydroxides can be used.

The amount of base used, expressed with reference to the weight of nitrile treated, is about 1 to 30 percent.

The hydrogenation can take place in an inert organic solvent under the reaction conditions. Recourse may be had to lower aliphatic alcohols such as methanol, ethanol, propanol and isopropanol; to diols, such as ethanediol-1,2, propanediol-1,2; to ethers, such as ethyl ether, butyl ether, dimethoxyethane, tetrahydrofuran and dioxane; to partial ethers of polyhydroxyl compounds, such as the monomethyl (or monoethyl) ether of ethylene glycol. The hydrogenation reaction can be employed at a temperature between about 30° and 100° C., and preferably between about 60° and 80° C., under a hydrogen pressure of about 10 to 200 bars. In general, a pressure of about 20 to 30 bars is well suited for the effecting of the hydrogenation.

In practice, the cyanoethylation product is added progressively to the suspension of the catalyst maintained under the hydrogen pressure selected.

After the hydrogenation reaction, the catalyst is removed, the basic agent is neutralized, the solvent is eliminated, and the aminoalkoxyamines can be distilled under reduced pressure.

The present invention is also directed to lubricating oils improved by the addition of about 1 to 10 percent of their weight of the lubricant additive compositions of the invention, which contribute their detergent-dispersant, anti-rust and anti-foaming properties to the said oils.

The lubricating oils which can be used can be selected from among a very wide number of lubricating oils, such as the lubricating oils of naphthene base, paraffin base or mixed base, other hydrocarbon lubricants, for instance, lubricating oils derived from coal products, and synthetic oils, for instance, alkylene polymers, polymers of the alkylene oxide type and their derivatives, including the alkylene oxide polymers prepared by polymerizing the alkylene oxide in the presence of water or alcohols, for instance, ethyl alcohol, dicarboxylic acid esters, liquid esters of phosphorus acid, alkyl benzenes and dialkyl benzenes, polyphenyls, alkyl biphenyl ethers, and polymers of silicon.

The quantity of new lubricant additives of the invention to be added is a function of the future use of the lubricating oil which is to be improved. Thus, for gasoline engine oil, the amount of additives to be added is desirably about 1 to 7 percent by weight. For a diesel engine oil, the amount is desirably from about 4 to 10 percent.

The improved lubricating oils may also contain antioxidant, anti-corrosion additives, etc.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

70 g. of oil 100 N and 430 g. of polyisobutenyl succinic anhydride (PIBSA) of an acid number of 77.7 (expressed in mg. of caustic potash necessary to neutralize 1 g. of product) obtained by condensation of maleic anhydride with a polyisobutene of a molecular weight of about 900, are introduced into a one-liter, three-neck, round-bottom flask. This reaction mixture is heated at 120° C. with agitation, whereupon 70 g. of tris(9-amino-3,6-dioxa-nonyl)amine are added over the course of one hour. The temperature of the reaction mixture is brought for 3 hours to 160° C. under a reduced pressure of 50 mm. of mercury. The product obtained consists primarily of tris-polyisobutenyl succinimide and contains 1.7 percent nitrogen.

The tris(9-amino-3,6-dioxa-nonyl)amine used can be prepared in the following manner by cyanoethylation of tris(5-hydroxy-3-oxa-pentyl)amine by acrylonitrile with a molar ratio of acrylonitrile to amine of more than 3.5, followed by hydrogenation of the nitrile obtained, as described below:

Cyanoethylation 70.5 g. of tris(5-hydroxy-3-oxa-pentyl)amine (namely, 0.25 mol) and 0.46 ml. of caustic soda of 36° Baumé (namely, $4.6 \times 10^{-3}$ mol) are introduced into a 250 ml. round-bottom flask provided with a mechanical agitator, a thermometer, a condenser, and a dropping funnel. The mixture is heated to 38° C., whereupon 53 g. of acrylonitrile (1 mol) are added within one hour. Upon the end of the addition of acrylonitrile, 0.6 ml. of HCl (d=1.19) is added in order to neutralize the caustic soda. The sodium chloride produced precipitates. After filtration, a straw yellow oil is obtained, formed of tris(8-cyano-3,6-dioxaoctyl)amine.

Hydrogenation

The foregoing product of cyanoethylation is hydrogenated in an autoclave under a hydrogen pressure of 40 bars at 60° C. in the presence of 60 g. of Raney nickel suspended in 130 ml. of ethanol and 0.75 ml. of caustic soda. The reaction is carried out in three hours. After cooling, the autoclave is degasified and opened under an atmosphere of nitrogen. Filtration is effected. After elimination of the catalyst, there are obtained 110 g. of oil, which corresponds to a yield of 97 percent.

The product obtained consists of tris(9-amino-3,6-dioxa-nonyl)amine of a purity of 98 percent.

EXAMPLE 2

50 g. of 100 N oil and 430 g. of polyisobutenyl succinic anhydride (PIBSA) of an acid number of 77.7 (expressed in mg. of caustic potash necessary to neutralize 1 g. of product) obtained by the condensation of maleic anhydride with a polyisobutene of a molecular weight of about 900, are introduced into a 1-liter, three-neck, round-bottom flask. The reaction mixture is heated at 120° C. with agitation, whereupon 45.2 g. of a mixture consisting of 85 percent tris(9-amino-3,6-dioxa-nonyl)amine, 12 percent of bis(9-amino-3,6-dioxa-nonyl)-N-(5-hydroxy-3-oxa-pentyl)amine, and 3 percent of N-(5-amino-3,6-dioxanonyl)-N,N-bis(5-hydroxy-3-oxa-pentyl)amine are added in the course of 1 hour. The temperature of the reaction mixture is brought for 3 hours to 160° C. under a reduced pressure of 50 mm. Hg. The clear product obtained consists for the major part of tris polyisobutenyl succinimide and contains a percentage of nitrogen of 1.08 percent. The mixture of aminoalkoxyamines employed to effect the imidation can be obtained in the following manner:

Cyanoethylation 70.5 g. of tris(5-hydroxy-3-oxa-pentyl)amine (0.25 mol) and 0.46 ml. of caustic soda of 36° Baumé ($4.6 \times 10^{-3}$ mol) are introduced into a 250 ml. round-bottom flask provided with a mechanical agitator, a thermometer, a condenser, and a dropping funnel. The mixture is heated at 38° C., and 42 g. of acrylonitrile (0.79 mol) are then added in the course of 1 hour. At the end of the addition of the acrylonitrile, 0.6 ml. of HCl (d=1.19) is added in order to neutralize the caustic soda. The sodium chloride formed precipitates. After filtration, an oil of straw yellow color is obtained.

Hydrogenation 110.3 g. of crude oil produced above by cyanoethylation, dissolved in 110 ml. of absolute ethanol, are introduced into a one-liter stainless steel autoclave provided with an agitation system and a hydrogen reserve of 250 ml., whereupon 56.9 g. of Raney nickel, suspended in 130 ml. of ethanol and 0.75 ml. of caustic soda (36° Baumé) namely, $4.8 \times 10^{-3}$ mol, are added. The autoclave is closed and purged three times with nitrogen (pressure of 10 bars) whereupon the hydrogen is introduced. The pressure is increased to 40 bars at room temperature by means of the pressure reducer controlling the feeding of hydrogen from the reserve. The mixture is heated to 60° C. The absorption of hydrogen ceases at the end of 2½ hours. After cooling, the autoclave is degasified and opened under an atmosphere of nitrogen. It is filtered and the catalyst is washed with ethanol. After elimination of the ethanol, a yellow oil is obtained, in the amount of 105.4 g., which corresponds to a yield of 93 percent.

The product is composed of:

85 percent tris(9-amino-3,5-dioxa-nonyl)amine, 12 percent bis-N,N-(9-amino-3,6-dioxa-nonyl)-N-(5-hydroxy-3-oxa-pentyl)amine, and 3 percent bis-N,N-(5-hydroxy-3-oxa-pentyl)-N-(9-amino-3,6-dioxa-nonyl)amine.

EXAMPLE 3

Under the conditions described in Examples 1 and 2, above, 500 g. of a mixture composed of 430 g. of polyisobutenyl succinic anhydride described in Examples 1 and 2, of an acid number of 77.7 mg., and 70 g. of 100 N oil are heated at 102° C. 70 g. of a mixture of polyamines consisting of 44 percent by weight of N,N-bis(5-hydroxy-3-oxa-pentyl)-N-(9-amino-3,6-dioxa-nonyl)amine, 44 percent of N-(5-hydroxy-3-oxa-pentyl)-N,N-bis(9-amino-3,6-dioxa-nonyl)amine, and 12 percent of tris(9-amino-3,6-dioxa-nonyl)amine is then introduced in the course of 1 hour. The temperature is brought for 3 hours to 160° C. under a reduced pressure of 50 mm. Hg. The product obtained consists of a mixture of polyisobutenyl succinimides and contains a concentration of nitrogen of 1.2 percent.

The mixture of aminoalkoxyamines employed to effect the imidation operation is obtained in the following manner:

Cyanoethylation

With the same apparatus as that described in the preceding example, the following reaction is carried out:

To 70.5 g. (0.25 mol) of tris(5-hydroxy-3-oxa-pentyl)amine, 0.46 mol of caustic soda of 36° Baumé is added. The mixture is heated to 38° C., and 20 g. of acrylonitrile are then introduced. 0.6 ml. of HCl (d=1.19) is added to neutralize the caustic soda. The sodium chloride formed precipitates. After filtration, there is obtained a straw yellow oil having the following composition:

| residual triol | 10% |
|---|---|
| monocyanoethylated triol | 40% |
| dicyanoethylated triol | 40% |
| tricyanoethylated triol | 10% |

Hydrogenation

This foregoing mixture (above) is hydrogenated by the method described in the preceding example. The mixture is heated to 60° C. The absorption of hydrogen stops at the end of 1½ hours. After cooling, the autoclave is degasified and opened under an atmosphere of nitrogen. It is filtered and the catalyst washed with ethanol. After elimination of the ethanol, a flask distillation is effected at 210° C. under 0.5 mm. Hg to recover, at the top, the untransformed triol and, at the bottom, the mixture of aminoalkoxyamines which is composed of: 44 percent of N,N-bis(5-hydroxy-3-oxa-pentyl)-N-(9-amino-3,6-dioxa-nonyl)amine, 44 percent of N-(5-hydroxy-3-oxa-pentyl)-N,N-bis(9-amino-3,6-dioxa-nonyl)amine, and 12 percent of N,N,N-tris(9-amino-3,6-dioxa-nonyl)amine.

EXAMPLE 4

The products of the invention which were obtained in accordance with the above examples were tested with respect to their dispersing properties in lubricants. The study of the dispersive power was carried out in accordance with the spot method described in Volume 1 of A. Schilling's book "Les huiles pour moteurs et le graissage de moteurs," 1962 edition, pages 89–90. The method was carried out on basis of 20 g. of SAE 30 oil, to which there had been added 5 g. of sludge coming from a Petter Av$_1$ engine and containing about 2 percent carbonaceous matter.

To the SAE 30 oil was previously added the following formulation (the quantities of the different additives being given for 1 kg. of oil):
40 g. of a dispersant obtained in one of Examples 1, 2 or 3;
30 mmols of calcium alkyl benzene sulfonate;
30 mmols of over-alkalinized calcium alkyl phenate; and
15 mmols of zinc dihexyldithiophosphate.

The mixture of the oil containing the above components and sludge was separated into 5 fractions, which were agitated and subjected to 5 heat treatments as follows:
one fraction subjected to heating at 50° C. for 10 minutes;
one fraction subjected to heating at 200° C. for 10 minutes;
one fraction subjected to heating at 250° C. for 10 minutes;
one fraction subjected to heating at 50° C. for 10 minutes in the presence of 1 percent water;
one fraction subjected to heating at 200° C. for 10 minutes in the presence of 1 percent water.

One drop of each mixture obtained after heat treatment was placed on filter paper.

Rating was effected at the end of 48 hours. For each spot there is calculated the percentage of dispersed product with respect to the spot of oil, using the ratio of the respective diameters of the spot of oil and of the dispersed product. The higher the percentage of dispersed product, the better the dispersion with respect to the sludge. The ratings appear in the table below.

EXAMPLE 5

The anti-rust properties of the products of Examples 1, 2 and 3 were each tested in SAE 30 oil to which there had been added the formulation of the preceding example, namely, for 1 kg. of oil:
40 g. of one of the products of Examples 1, 2, or 3;
30 mmols of calcium alkylbenzene sulfonate;
30 mmols of over-alkalinized calcium alkylphenate; and
15 mmols of zinc dihexyldithiophosphate.

The principle of the test consists in adding to the oil under study the products which may be present in the blow-by gases and which play a role in the formation of rust on the assembly consisting of the valve stem and tappet, and immersing a piece forming part of the preceding assembly in the resultant mixture for a certain period of time. The rust formed is rated visually.

The test is carried out by:
introducing 700 g. of oil into a round-bottom flask and heating to 50° C. with agitation;
adding successively, when the temperature is stabilized, 20 cc. of an aqueous solution of 30 percent formaldehyde, 4.5 cc. of methanol, 5 cc. of a 50/50 mixture of dichlorethane and dibromethane, and 8.5 cc. of a 78.5 percent aqueous solution of nitric acid;
immersing for 19 hours a piece of the valve rod and tappet assembly.

When there is no attack, the product is given a grade of 20; when the attack is very extensive, it is given a grade of zero. The results of the ratings appear in the table below.

EXAMPLE 6

The anti-foam properties of the products of Examples 1, 2 and 3 are measured in accordance with ASTM Standard D 892.63 in the SAE 30 oil to which there has been added the formulation indicated in Examples 4 and 5.

The results of the ratings appear in the table below.

By way of comparison, there is included in the table appearing below the results of the tests of the dispersing, anti-rust and anti-foam properties, carried out under the conditions described in Examples 4 to 6, on certain prior art succinimides, namely:

I. The tris(polyisobutenyl succinimide) derived from tris(6-amino-3-oxa-hexyl)amine and a PIBSA of an acid number of 74, obtained by condensing maleic anhydride and a polyisobutene of a molecular weight of close to 1000.

II. The bis(polyisobutenyl succinimide) derived from triethylenetetramine and a PIBSA of an acid number of 74, obtained by condensing maleic anhydride and a polyisobutene of a molecular weight close to 1000.

TABLE

| Products | Performances | | |
|---|---|---|---|
| | Dispersion | Anti-rust | Anti-foam |
| Example 1 | 450 | 15 | 10–05 |
| Example 2 | 430 | 17 | 10–05 |
| Example 3 | 400 | 15 | 10–05 |
| Comparison: | | | |
| I Comparison (above) | 390 | 12 | 20–50 |
| II Comparison (above) | 320 | 9 | 580–450 |

As can be seen from the foregoing table, the products of the present invention have excellent dispersion, anti-rust and anti-foam properties when employed in lubricants.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A lubricant additive composition based on alkenyl succinimides comprising at least one alkenyl succinimide of the formula:

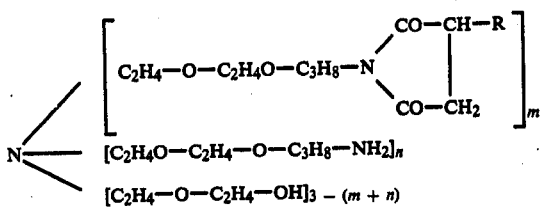

in which

R represents an alkenyl group containing from about 20 to 200 carbon atoms;

m is a whole number from 1 to 3;

n is zero or a whole number up to 2, with m+n being from 1 to 3.

2. A lubricant additive composition according to claim 1, wherein R is a polyisobutenyl group.

3. A process of preparing a lubricant additive composition according to claim 1, which process comprises condensing an alkenyl succinic anhydride in which the alkenyl group contains from about 20 to 200 carbon atoms, with at least one aminoalkoxyamine of the formula:

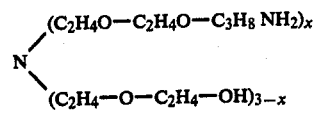

in which x is a whole number from 1 to 3, in a ratio of number of equivalents of amine to number of equivalents of acid of between about 0.4 and 0.6 to 1, at a temperature between about 120° and 230° C.

4. A process according to claim 3, wherein the alkenyl group is a polyisobutenyl group.

5. A process according to claim 3, wherein the temperature is between about 140° and 180° C.

6. A lubricating composition, having desirable dispersion, anti-rust and anti-foam properties, comprising an oil containing between about 1 and 10 percent by weight of a lubricant additive composition according to claim 1.

7. A lubricating composition, having desirable dispersion, anti-rust and anti-foam properties, comprising an oil containing between about 1 and 10 percent by weight of a lubricant additive composition according to claim 2.

8. A gasoline engine oil, having desirable dispersion, anti-rust and anti-foam properties, containing between about 1 and 7 percent by weight of a lubricating additive composition according to claim 1.

9. A diesel engine oil having desirable dispersion, anti-rust and anti-foam properties containing between about 4 and 10 percent by weight of a lubricating additive composition according to claim 1.

* * * * *